United States Patent [19]

Cole

[11] Patent Number: 4,905,409
[45] Date of Patent: Mar. 6, 1990

[54] LANDSCAPING TIMBER

[76] Inventor: Clayton K. Cole, 1821 Hillsdale Ave., Kalamazoo, Mich. 49007

[21] Appl. No.: 118,856

[22] Filed: Nov. 9, 1987

[51] Int. Cl.$^4$ ............................................. A01G 1/00
[52] U.S. Cl. .......................................... 47/33; 52/102; 52/233
[58] Field of Search ...................... 47/33; 52/102, 233, 52/245; 446/107, 108, 111, 122, 123

[56] References Cited

U.S. PATENT DOCUMENTS

| | | | |
|---|---|---|---|
| 535,497 | 3/1895 | Herth | 52/245 |
| 678,052 | 7/1901 | Slye | 52/233 |
| 2,320,292 | 5/1943 | Nelson | 446/122 |
| 2,397,119 | 3/1946 | Bohn | 52/279 |
| 2,888,779 | 6/1959 | Hostetter | 52/102 X |
| 4,503,648 | 3/1985 | Mahaffey | 52/233 X |

FOREIGN PATENT DOCUMENTS 949818 9/1949 France ........................... 446/111

Primary Examiner—Robert A. Hafer
Assistant Examiner—Sam Rimell
Attorney, Agent, or Firm—Price, Heneveld, Cooper, De Witt & Litton

[57] ABSTRACT

A landscaping system for the building of retaining walls for decorative borders comprised of landscaping units which are interlocked and secured together to form various regular and irregular formations. The landscaping units include two identical timber members which are fastened together in an overlapping, but longitudinally offset, relationship, which thereby define a projecting portion which extends outwardly at each end of the unit. In forming the designs, the projecting portions of different units are overlapped and joined together to form the border or wall.

8 Claims, 4 Drawing Sheets

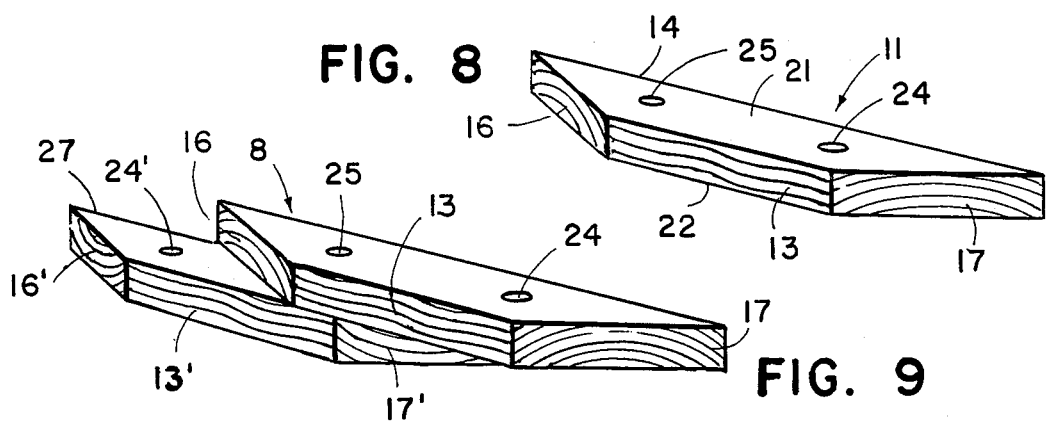
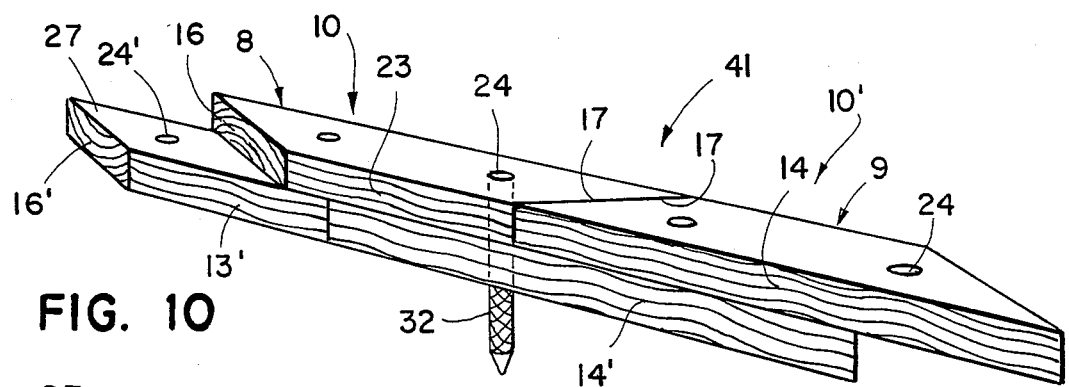
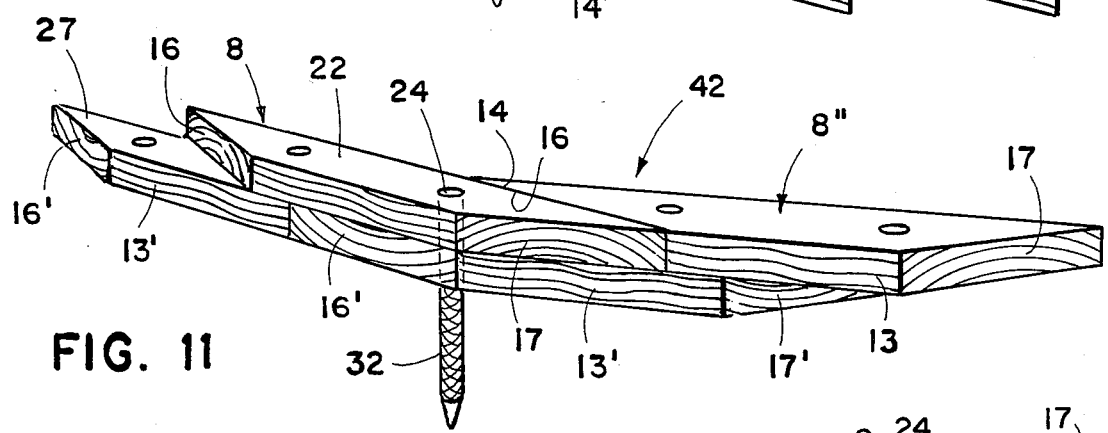
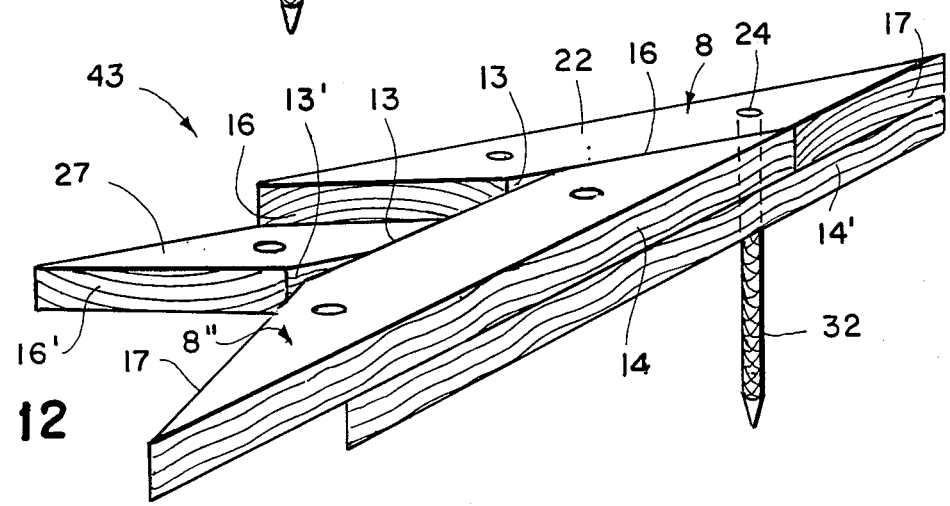

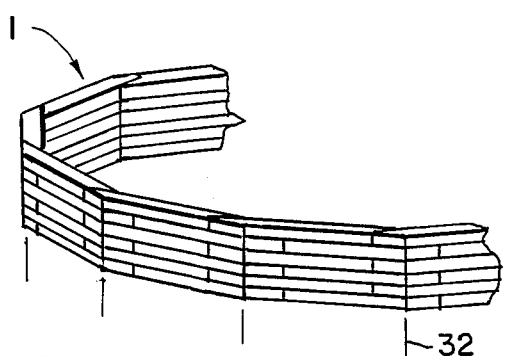
FIG. 13
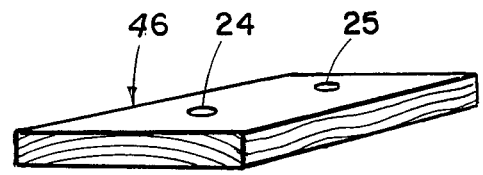
FIG. 15
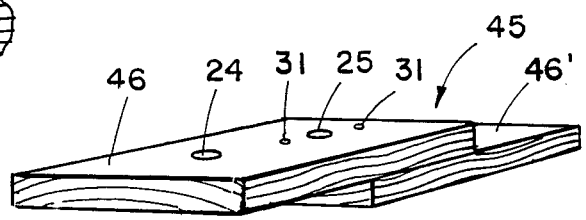
FIG. 16
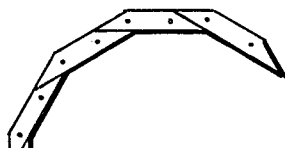
FIG. 14
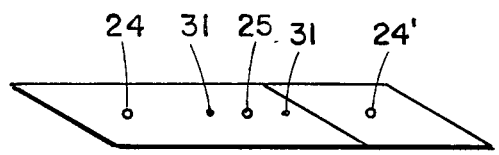
FIG. 17
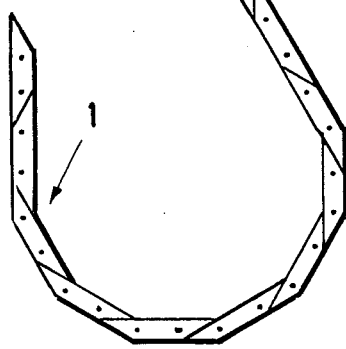
FIG. 18
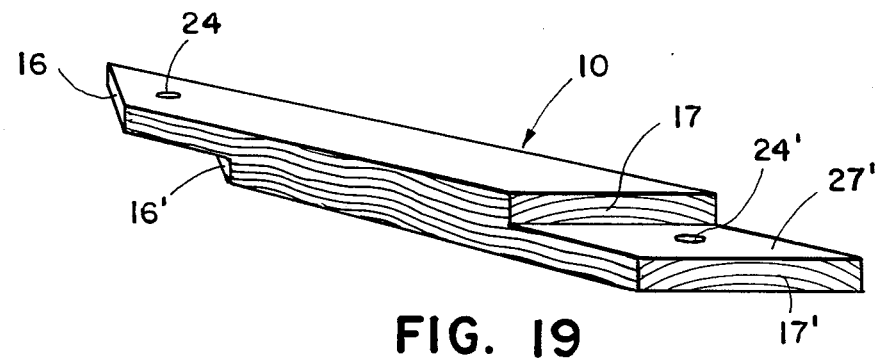
FIG. 19

LANDSCAPING TIMBER

BACKGROUND OF THE INVENTION

The present invention pertains to landscaping timber utilized to form retaining walls and decorative borders about trees, sidewalks, sandboxes or the like.

In the landscaping of grounds, it is a popular practice for homeowners and professional landscapers alike, to employ railroad ties or the like in the forming of retaining walls in terraced grounds or decorative borders around the base of trees, along walks, etc. Yet, railroad ties are generally unwieldy, and hence, difficult to align and fasten together in a cohesive, visually appealing manner. The problem is particularly acute when the border begins to deviate from a straight-line formation. Invariably, gaps and projecting corners are created which detract not only from the visual attractiveness of the structure, but also from its ability to retain filler material or the ground behind it if intended to be a retaining wall.

In an effort to alleviate the difficulties encountered in using railroad ties, past artisans have provided angled connecting pieces doweled to the straight-line pieces in an attempt to eliminate gaps and projecting corners when nonlinear or irregular border shapes are desired. An example of such a construction is illustrated in U.S. Pat. No. 3,545,128 issued Dec. 8, 1970 to La Fontaine et al., and entitled LAWN EDGING. However, the addition of the connecting members adds even more pieces which require careful alignment and/or complicated attachment procedures. Also, for each particular shape that the landscaper may desire to form, a new connecting piece of a specific shape may be required, thus leading to an undue multiplicity of parts.

SUMMARY OF THE INVENTION

The aforementioned problems are overcome in the present invention, wherein retaining walls and decorative borders in landscaping may be easily and attractively formed with unique and novel landscaping timber. This timber is shaped to be readily joined with other identical timber to form an unlimited variety of informal borders and many closed formal borders for various purposes.

Landscaping units are the basic building block of the present invention and include a pair of identically shaped timber members fastened together in an overlapping, but offset, relationship. This arrangement defines a projecting portion which extends from each end of the unit to enable units to be easily interlocked with each other. A hole is provided in each projecting portion for aligning and combining the timber members in relation to each other in an overlapping and interlocking pattern.

The landscaper may, by employing this bordering system, easily construct an attractive and durable wall or border with a minimum of tools at the site. The landscaping unit of the system may be fashioned into straight or angled assemblies without the unsightly appearance of gaps and projecting corners. The landscaping units 11 matingly interlock to ensure proper alignment for the desired shape to be constructed. Moreover, the units of the present invention are efficiently and economically fabricated. Also, in spite of the infinite variations that may be had through the use of the present invention, this system only requires a minimal variety of parts for the manufacturer to keep in inventory.

These and other objects, advantages and features of the present invention will be more fully understood and appreciated by reference to the written specification and appended drawings.

BRIEF DESCRIPTION OF THE DRAWINGS

FIG. 8 is a perspective view of a single trapezoidal timber member of the present invention;

FIG. 9 is a perspective view of a right-handed trapezoidal landscaping unit of the present invention;

FIG. 10 is a perspective view of the present invention wherein a right-handed and left-handed landscaping unit is joined to form a straight line;

FIG. 11 is a perspective view of the present invention wherein two right-handed landscaping units are joined to form an obtuse angle;

FIG. 12 is a perspective view of the present invention wherein two right-handed landscaping units are joined to form an acute angle;

FIG. 13 is a perspective view showing the landscaping units in a tiered arrangement;

FIG. 14 is a top plan view showing the landscaping units joined in an irregular serpentine arrangement;

FIG. 15 is a perspective view of a single parallelogram timber member of the present invention;

FIG. 16 is a perspective view of a parallelogram landscaping unit of the present invention;

FIG. 17 is a top plan view of the unit of FIG. 14;

FIG. 18 is a front elevational view of the unit of FIG. 14;

FIG. 19 is a perspective view of a left-handed trapezoidal landscaping unit of the present invention formed as a unitary piece;

DETAILED DESCRIPTION OF THE PREFERRED EMBODIMENT

Figure 1:
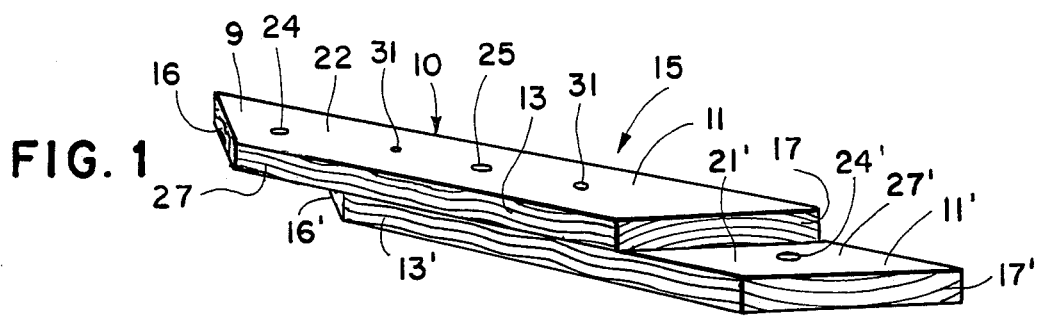
FIG. 1 is a perspective view of a left-handed trapezoidal landscaping unit of the present invention.
Figure 2:
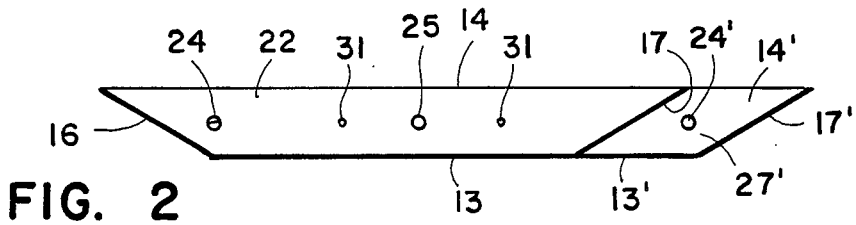
FIG. 2 is a top plan view of the unit of FIG. 1.
Figure 4:
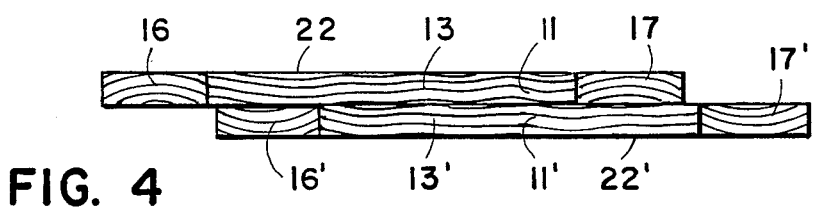
FIG. 4 is a front elevational view of the unit of FIG. 1.
Figure 6:
FIG. 6 is an end elevational view of the unit of FIG. 1.
Figure 3:
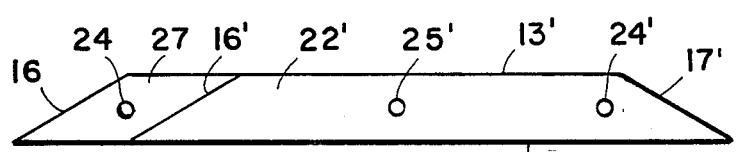
FIG. 3 is a bottom plan view of the unit of FIG. 1.
Figure 5:
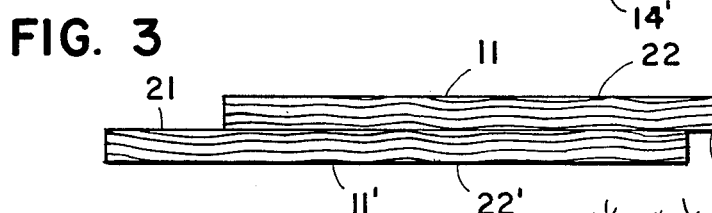
FIG. 5 is a rear elevational view of the unit of FIG. 1.

In landscaping, it is often desirable to provide a retaining wall if the grounds are terraced or a raised border around the base of a tree 3 or the like. The shapes and designs of the walls and borders are generally quite varied to suit all types of uses in different environments. Indeed, the shapes and designs available with the present landscaping system 1 are limited only by the landscaper's imagination.

In the preferred embodiment, decorative borders and retaining walls are easily fashioned through the use of landscaping units 10 (FIGS. 1-6) comprised of two correspondingly shaped timber members 11 and 11' which are fastened together in an overlapping, but offset, relationship. Landscaping units 10 are then interlocked with each other to form an infinite variety of shapes and designs in a durable, attractive and efficient manner. The landscaping units 10 are referred to as "trapezoidal" units 5 because the units and both timbers 11 and 11' are trapezoidal in plan view.

Timber member 11 is composed preferably of wood, but could be composed of other materials possessing the requisite characteristics. Timber member 11 is trapezoidal in shape having two parallel side surfaces 13, 14, two nonparallel side walls 16, 17, and forward and rearward trapezoidal faces 21, 22. Side walls 16, 17 are both inclined inwardly toward side surface 13, making side surface 13 substantially shorter than side surface 14. Note further, that side walls 16, 17 are inclined at the same angle, which is generally about 30, to side surfaces 13, 14 (although it could of course be at any angle to suit specific needs).

Passing through timber member 11, via forward and rearward faces 21, 22, are a pair of bores 24, 25. One bore 24 is a joining bore adapted to receive therethrough a stake 32 which functions to lock one landscaping unit 10 to another and secure the coupled units 10, 10' (FIG. 10) to the ground. The other bore 25 is a coupling bore adapted to receive therethrough an aligning means which functions to mount one timber member 11 to another to form a landscaping unit 10. Furthermore, if desired, bore 25 may also be used to receive a stake 32 therethrough and thereby provide additional means by which units 10 may be secured to the ground.

Landscaping units 10 are formed by fixedly coupling two identical timber members 11, 11' in an overlying, but longitudinally offset, relationship. The offset relationship defines at each end of unit 10 a projecting portion 27, 27' which is shaped as a parallelepiped (FIGS. 2 and 3). while the overall length of units 10 may be varied (FIGS. 1 and 8), the dimensions of projecting portions 27, 27' are preferably the same to facilitate universal joining between all units 10, regardless of their individual lengths.

Despite the fact that timber members 11 of any one unit 10 are identically shaped, they are inversely coupled to each other when forming unit 10. More specifically, one timber member 11' is inverted, such that its forward surface 21' is positioned flush against forward surface 21 of corresponding timber member 11. This orientation positions one joining bore 24 at one end of unit 10 and the other 24' at the opposite end thereof. Also when thusly mounted, side surface 13 is aligned with side surface 13'; and side surface 14 is aligned with side surface 14' ; that is, the aligned side surfaces lie in the same plane with each other.

Further, in the fabrication of landscaping units 10, coupling bores 25 of each timber member 11, 11' are aligned. A holding means, generally in the form of a rod or bar (not shown), is passed through coupling bores 25 to thereby hold timber members 11, 11' in place for subsequent fastening. While timber members 11, 11' are thusly held, two or more spikes or the like 31 are driven through both timber members 11, 11' to fixedly couple them in forming one unit 10.

This procedure of properly positioning the two timber members 11, 11' by the mere aligning of the two coupling bores 25, 25' greatly enhances the production capabilities of a manufacturer of the present invention. Coupling bores 25, 25' need to be accurately placed, so that when timber members 11, 11' are inversely coupled to form unit 10, projecting portions 27, 27' of correct dimensions will be defined. The placing of coupling bore 25 will be the same for all timber members 11 of the same length, but will vary along the length thereof for timber members 11 of different lengths. The determinative factor, then, on positioning coupling bores 25 is to define projecting portions 27, 27' of the proper dimensions.

Even though timber members 11, 11' are identically shaped, they may be oriented in two different ways, which will hereinafter be designated as right-handed and left-handed. More specifically, when looking straight on shorter side surfaces 13, 13' of unit 10, the upper timber member 11 may be offset to the right (FIG. 9) thereby forming a right-handed unit 8 or to the left (FIG. 1) thereby forming a left-handed unit 9. Landscaping borders or walls are formed by interlocking and joining different units 10 together.

Units 10 are interlocked by overlapping the projecting portions 27 in different ways. Adjacent joining bores 24 of the two abutting units are aligned for passage of a pin or stake 32, which is generally driven therein by the landscaper at the site. Stakes 32 are preferably longer than the combined width of the overlapping timber members 11, so that they may be also driven into the ground to more securely hold units 10 in place. Also, as noted previously, stakes 32 may also be driven through bores 25 to additionally secure the units 10 to the ground.

As illustrated in FIG. 10, units 10 may be interlocked to form a straight assembly 41. Straight assembly 41 is made by joining a right-handed unit 8 with a left-handed unit 9. More specifically, left-handed unit 9 is inverted relative to unit 8, and positioned such that projecting portions 27 are in an overlapping relationship. Further, in a straight assembly 41, side surfaces 13, 13', 14, 14' of units 8, 9 are aligned to form a smooth attractive appearance; and side walls 17, 17' of unit 8 abut side walls 17, 17' of unit 9, respectively, to preclude the formation of any gaps therein. This arrangement of aligning side surfaces 13, 13', 14, 14' and abutting side walls 17, 17' provides the landscaper with a visual guide by which joining bores 24, 24' way be easily aligned for passage of stake 32.

Referring FIG. 11, an obtuse assembly 42 is formed by interlocking units 10 in such a way so as to define an inner angle which is preferably approximately 150°. In the forming of obtuse assembly 42, two righthanded units 8, 8'' are interlocked with overlapping projecting portions 27. Note that side wall 16 and side surface 14' of unit 8'' abut side surface 14 and side wall 17' of unit 8, respectively. Again, this assembly creates a smooth, attractive appearance for a border or wall. Also, as with straight assembly 41, the abutting surfaces act as a guide by which joining bores 24, 24' are aligned for passage of stake 32. Although the illustrated example shows two right-handed landscaping units, assembly 42 could likewise be assembled with two left-handed landscaping units.

As illustrated in FIG. 12, units 10 may be interlocked to form an acute assembly 43. Acute assembly 43 is formed by interlocking two right-handed units 8, 8'' in such a way so as to define an inner angle which is preferably approximately 30. In the illustrated example, projecting portions 27 of right-handed units 8, 8'' are overlapped such that side wall 16 and side surface 13' of unit 8'' abut side surface 13 and side wall 17' of unit 8, respectively. Again, this assembly creates a smooth, attractive appearance for a border or wall, and the abutting surfaces act as a guide by which joining bores 24, 24' are aligned for passage of stake 32. As with obtuse assembly 42, even though acute assembly 43 has been formed in the illustrated example with two right-handed units, it may also be formed with two left-handed units.

Figure 7:
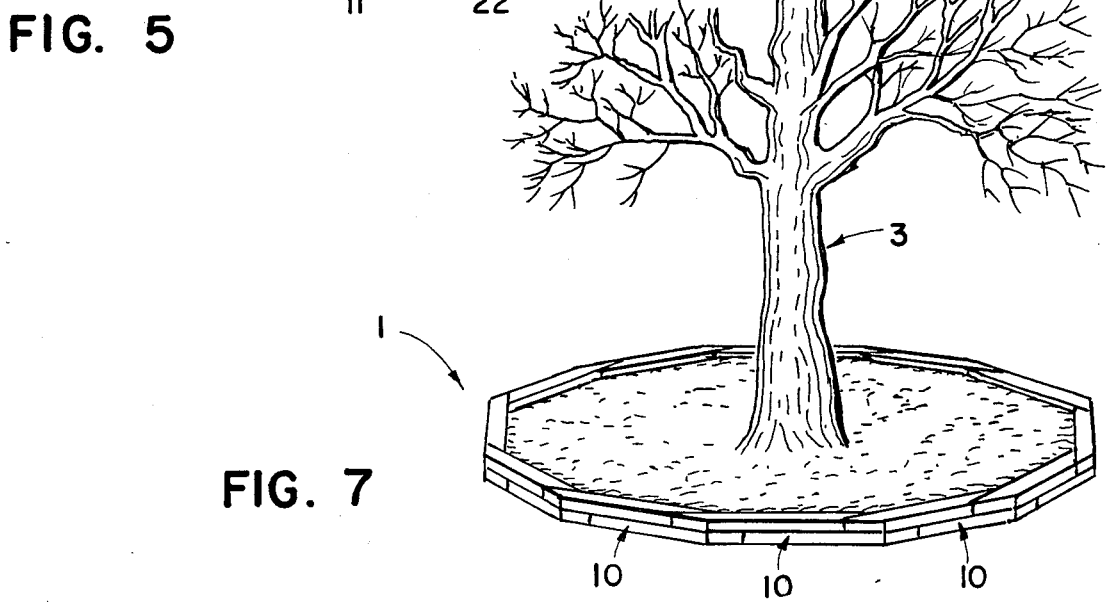
FIG. 7 is a perspective view showing a plurality of landscaping units interconnected about the base of a tree.
Figure 20:
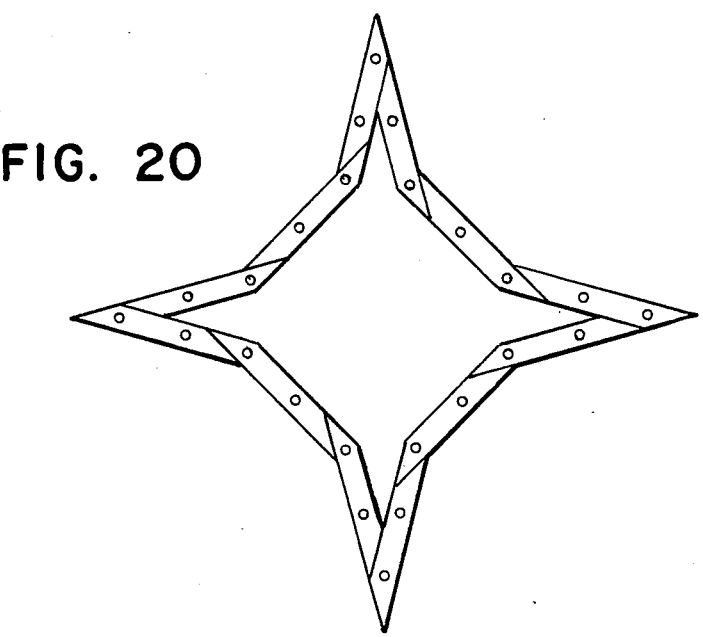
FIG. 20 is a top plan view of a plurality of trapezoidal units of the present invention positioned and interlocked into a star shape.
Figure 21:
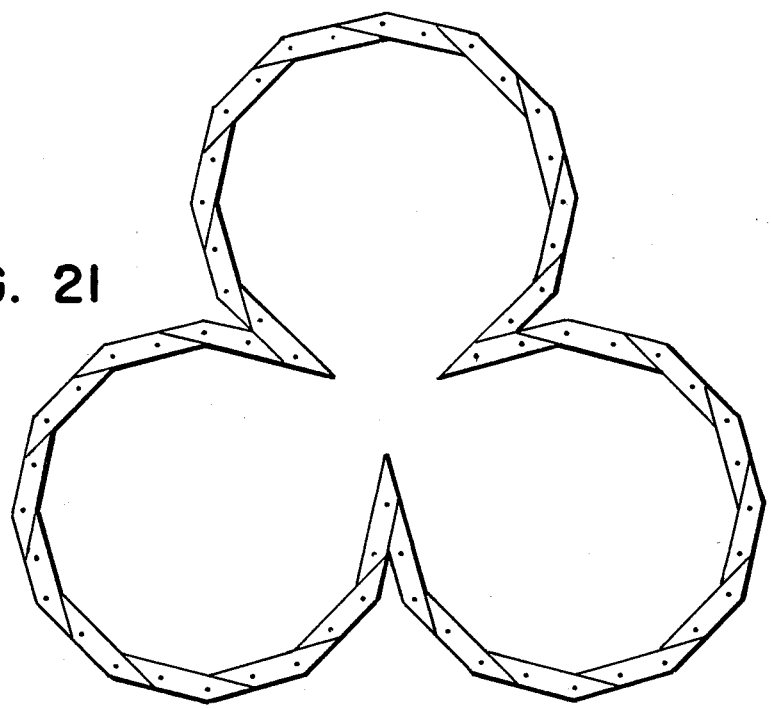
FIG. 21 is a top plan view of a plurality of trapezoidal units of the present invention positioned and interlocked into a cloverleaf shape.

With these three assemblies all sorts of regular (FIGS. 7, 20 and 21) and irregular (FIG. 13) formations may be fabricated. Borders and walls are easily constructed by such interlocking of units 10. The exterior surfaces thereof are smooth and neat, and substantially devoid of gaps and projecting corners. Also, with the interlocking and abutting surfaces, joining bores 24, 24' may be easily and quickly aligned for assembly.

Also, as seen in FIG. 13, the units may be stacked upon one another to form, for example, retaining walls. Each row of units are interlocked in the same manner as discussed above. Once the wall has been made to the desired height an elongated pin is driven through the aligned joining bores 24 24' of the entire wall and into the ground, to thereby secure the wall together and anchor it to the ground.

Although trapezoidal unit 10 has been discussed in great detail, it is clear that other shapes may be utilized. In FIGS. 16–18, a parallelogram landscaping unit 45 including timber members 46, 46' which are parallelepipedal in shape Each unit 45 is provided with a pair of joining bores 24 and a coupling bore 25. Timber members 46, 46' are coupled together in the same manner as is the first embodiment 5, so that a parallelogram projecting portion 27 is defined at each end of unit 10. Projecting portions 27 are then overlapped and coupled together with a pin 32.

Since all of the embodiments are provided with projecting portions 27, 27' of the same shape (parallelogram) and dimensions, they may be all utilized together in the same decorative border or retaining wall, because they are all commonly interlocked. It is clear, then, that various kits of one embodiment or a combination of the different embodiments may be fashioned to form various formations.

Concerning all units of all of the embodiments, it is seen in FIG. 19, that a unit may, if desired, be formed as a unitary member from one piece of wood or the like. The use of such a unit is identical, and therefore, will not be further discussed.

Of course, it is understood that the above descriptions are those of preferred embodiments of the invention. Various other embodiments, as well many changes and alterations, may be made without departing from the spirit and broader aspects of the invention as defined in the claims which are to be interpreted in accordance with the principles of patent law including the doctrine of equivalents.

The embodiments of the invention in which an exclusive property or privilege is claimed are defined as follows:

1. A landscaping system for building borders or walls on the ground, said system comprising a plurality of units which are interlocked and secured together, wherein said units each include:

a pair of identically shaped non-rectangular members fixedly coupled together such that said members are in an overlapping but longitudinally offset relationship, said members each defining parallel, aligning side surfaces and a projecting portion at each end thereof, the projecting portion at each end overlapping the projecting portion of an adjacent unit, said projecting portions each including spaced, parallel surfaces adapted to abut against an adjacent member, said abutting surfaces being non-perpendicular to said aligning side surfaces so that the system defines non-rectangular borders or walls; and joining means for interconnecting said overlapping portions and for staking the units to the ground, each said non-rectangular member having first and second parallel side surfaces, said first side surface being shorter than said second side surface, and wherein said members are positioned in each said unit such that said aligning side surfaces are defined by first side surfaces being aligned in the same plane and said second side surfaces being aligned in the same plane.

2. The landscaping system of claim 1 in which said joining means including a joining hole provided in each said projecting portion of each unit, each of said holes being aligned with a corresponding hole in another unit, and stake means extending through aligned holes for joining two units together.

3. The landscaping system of claim 1 in which said members are trapezoidal in shape.

4. The landscaping system of claim 3 in which each said member includes a coupling bore, wherein said coupling bores are aligned with each other when said members are assembled into said unit.

5. The landscaping system of claim 1 in which said projecting portions are parallelepipedal in shape.

6. The landscaping system of claim 5 in which said units are of varying overall length, and in which said projecting portions of each said unit are of equal dimensions, whereby said units of different overall lengths may be coupled together.

7. The landscaping system of claim 1 in which each said member is identically shaped and each provided with a forward face, and said members are positioned in any one unit such that said forward faces are flush against one another.

8. The landscaping system of claim 1 in which said members are parallelepipedal in shape.

* * * * *

UNITED STATES PATENT AND TRADEMARK OFFICE
CERTIFICATE OF CORRECTION

PATENT NO. : 4,905,409
DATED : March 6, 1990
INVENTOR(S) : Clayton K. Cole

It is certified that error appears in the above-identified patent and that said Letters Patent is hereby corrected as shown below:

Column 1, line 63;

"11" should be --all--.

Column 3, line 18;

"30" should be --30°--.

Column 4, line 46;

After "Referring" insert --to--.

Column 4, line 65;

"30" should be --30°--.

Column 6, line 32;

"including" should be --includes--.

Signed and Sealed this

Twenty-seventh Day of August, 1991

Attest:

HARRY F. MANBECK, JR.

*Attesting Officer*      *Commissioner of Patents and Trademarks*